United States Patent Office 3,135,431
Patented June 2, 1964

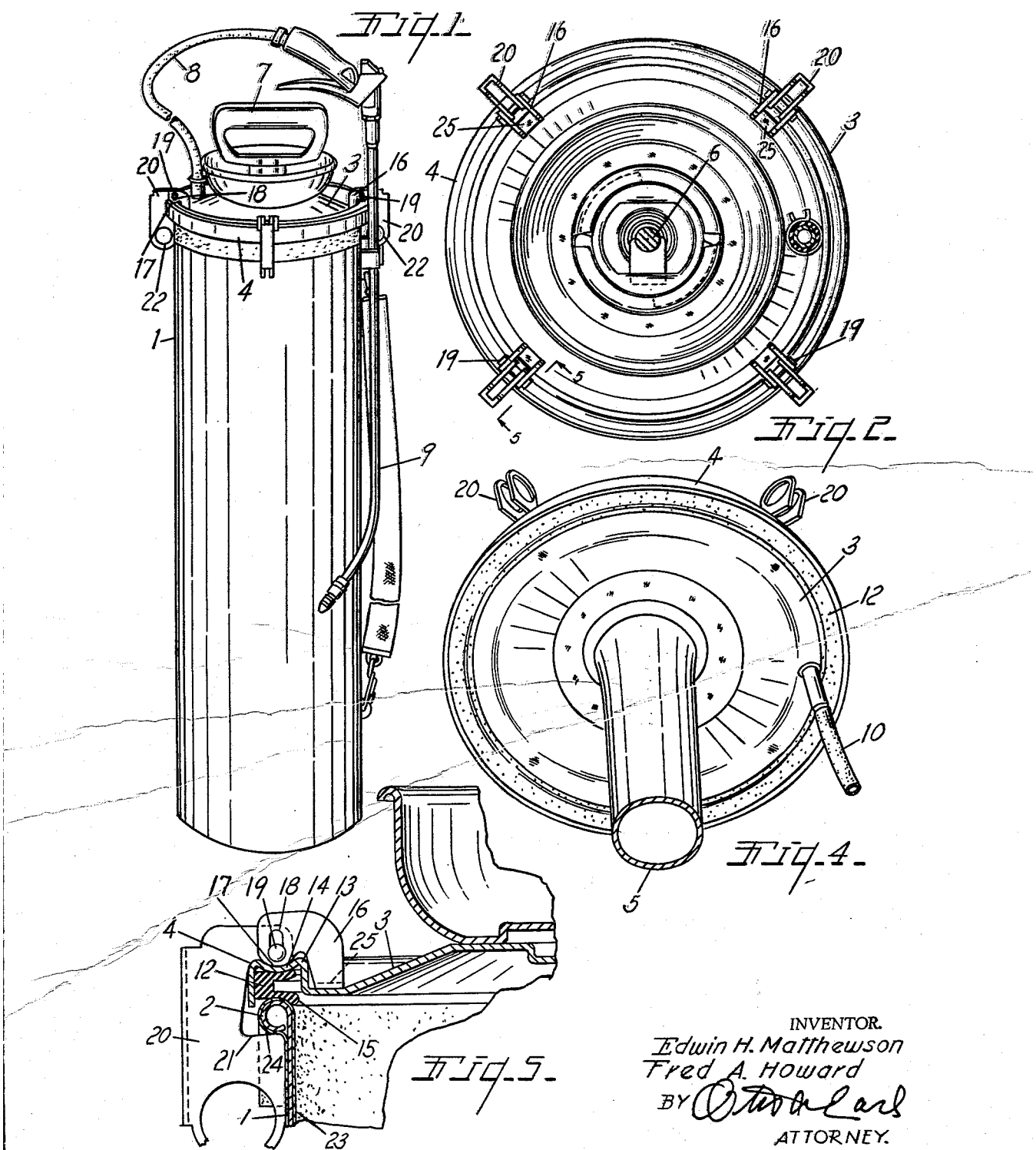

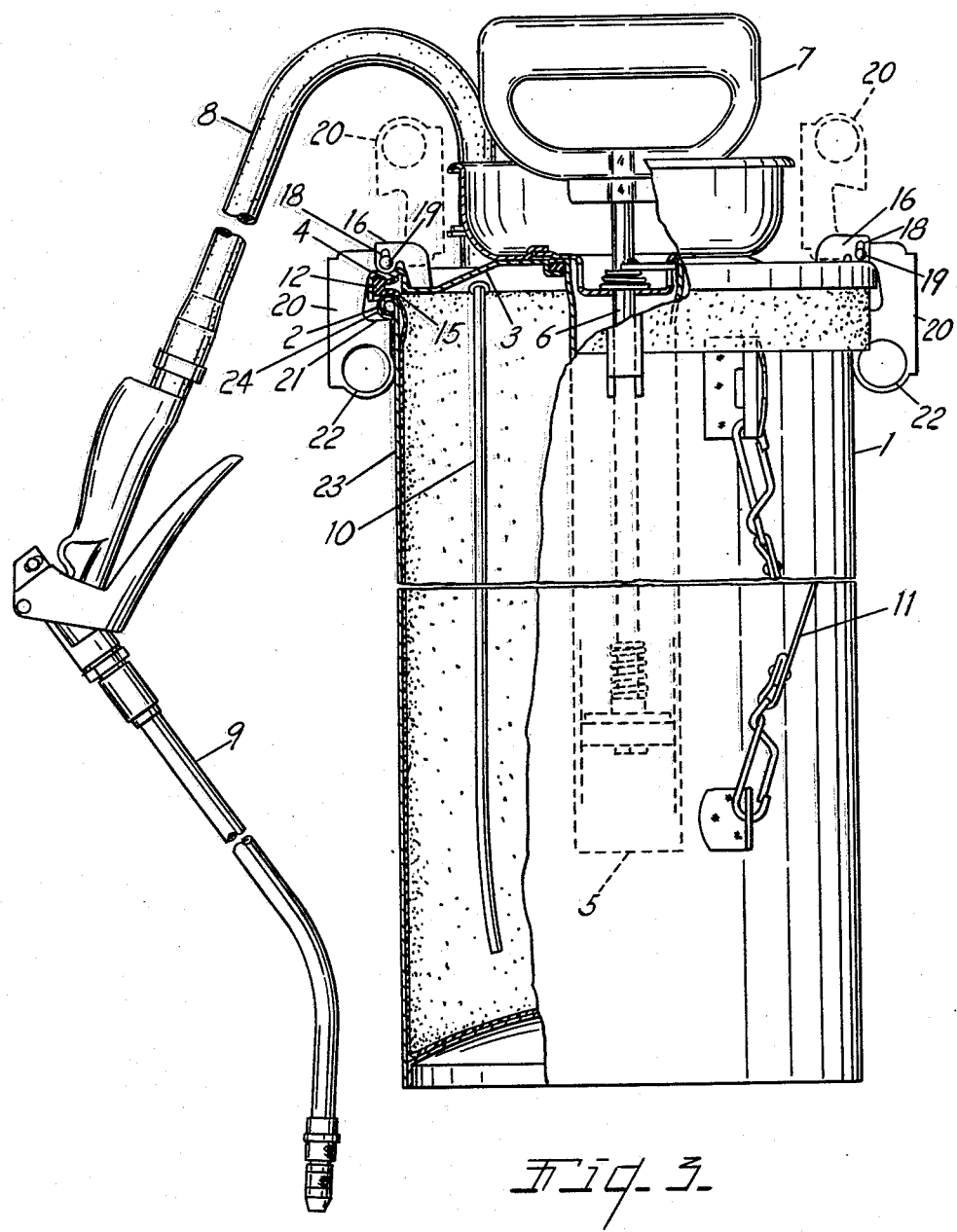

3,135,431
SPRAYERS OF THE PORTABLE MANUALLY MANIPULATABLE TYPE (OPEN TOP SPRAYER—RENEWABLE LINER)
Edwin H. Matthewson and Fred A. Howard, Saranac, Mich., assignors, by mesne assignments, to Leigh Products, Inc., Coopersville, Mich., a corporation of Delaware
Filed Dec. 17, 1962, Ser. No. 244,983
9 Claims. (Cl. 222—183)

This invention relates to sprayers of the portable manually manipulatable type.

The main objects of this invention are:

First, to provide a sprayer of the portable, manually manipulatable type comprising a receptacle which constitutes the body of the sprayer and is open at its upper end, and a cover removably mounted on said receptacle and having a pump and discharge means supportedly mounted thereon, and sealing means supportedly mounted on the cover to coact with the upper end of the receptacle.

Second, to provide a sprayer having these advantages in which the cover has means thereon for clampingly securing it to the receptacle and applying pressure to said sealing means.

Third, to provide a sprayer apparatus embodying these features in which pressure in the receptacle acts to urge the sealing means into sealing engagement with the cover and the receptacle.

Fourth, to provide the receptacle with a liner of flexible material disposed with an upper portion thereof in overlapping supported engagement with and between the rim of the receptacle and said sealing means and clampingly secured therebetween.

Objects relating to details and economies of the invention will appear from the description to follow. The invention is defined and pointed out in the claims.

A preferred embodiment of the invention is illustrated in the accompanying drawing, in which:

FIG. 1 is a perspective view of a sprayer embodying my invention.

FIG. 2 is a top view with the pump rod shown in section.

FIG. 3 is a fragmentary side elevational view with parts shown in vertical section, the cover clamp members being shown in open position by dotted lines.

FIG. 4 is a fragmentary inner perspective view of the cover.

FIG. 5 is an enlarged fragmentary view on a line corresponding to line 5—5 of FIG. 2.

In the embodiment of our invention illustrated, the receptacle 1 is cylindrical and is provided with an outwardly projecting annular rim 2 of cylindrical cross section. The cover 3 has an annular upwardly offset rim portion 4 of downwardly facing channel cross section which is disposed in overhanging noncontacting relation to the rim 2 of the receptacle. The cover has a centrally disposed depending pump cylinder 5 mounted thereon with a pump rod designated by the numeral 6 provided with a handle 7 at its upper end. The discharge pipe 8 is provided with a manually manipulatable nozzle portion 9 at its outer end, the discharge tube 10 being mounted on the cover to depend into the receptacle.

The details of the pump and the discharge form no part of the present invention so they are not further described, and that also applies to the hanger strap 11 which is conventionally shown in FIG. 1 and it is desired to point out that it is common practice to provide sprayers with pumps and discharge conduits, and hanger straps.

The integral annular, upwardly offset, downwardly facing rim of the cover provides a channel for the annular gasket 12 which is of inwardly facing channel cross section, the upper flange 13 being in supported engagement when the downwardly curved top portion 14 of the rim and the lower flange 15 of the gasket are in supported, clamping engagement with the annular rim 2 of the receptacle.

The cover is provided with annularly spaced clamping units for securing the cover to the receptacle and these units comprise the brackets 16 which are fixedly secured to the cover at the inner sides of the upwardly projecting gasket-receiving portion thereof and overhang the top of the channel and with the lower edges 17 thereof in supported engagement with the curved upper portions of the cover rim. These brackets are provided with vertical slots 18 with which the pivots 19 of the clamp 20 are slidably and pivotally engaged.

These clamps 20 are provided with jaw portions 21 which are engageable with the rim 2 on the receptacle as is clearly illustrated in FIGS. 3 and 5 and the resilient gasket is proportioned so that it is placed under clamping stress when the clamps are in engagement with the rim of the receptacle as is illustrated in the drawings. This results in an effective seal between the cover and the receptacle and as there are no contacting metal parts of the cover and the receptacle, the varations in the seal resulting from production and use do not affect the sealing capacity.

The clamps are provided with holes 22 adapted to receive a finger of the operator or to be engaged to facilitate gripping engagement of the clamps between a finger and thumb of the operator.

The embodiment of our invention illustrated includes a liner 23 desirably formed of liquid-resistant thermoplastic material such for example as polyethylene. It is dimensioned to supportedly fit within the receptacle with its upper edge portion 24 wrapped outwardly over the rim and desirably projecting downwardly against the outer side of the rim as is illustrated in the drawings and it is clampingly engaged by the gasket and is securely held by the jaws of the clamps and the portions thereof which clampingly engage the outer sides of the receptacle, see FIG. 5.

The clamps 20 of the embodiment of our invention illustrated are formed of sheet metal stock and are of inwardly facing channel section and the brackets 16 are of upwardly facing U-shape, their bight portions 25 being welded to the top of the cover at the inner sides of the rim and with their arms in supporting engagement with the rim. These structural features permit the use of relatively light stock and at the same time the parts are capable of withstanding substantial stresses to which they are subjected in use. The forming of the clamps in this manner also adds to the convenience in grasping for manipulation.

The filled sprayers are commonly carried by the pump handle so the entire load is on the couplings for the cover to the receptacle.

It will be understood that the thickness of the liner as illustrated in the drawing is greater than its actual thickness which is, as stated, desirably of waterproof film-like material such as polyethylene.

With this structure and arrangement of parts the thin liner is effectively supported and so that it cannot collapse within the receptacle, and when the cover is removed it can be lifted from the receptacle. This is a desirable feature for the reason that these spray solutions quite frequently are of a character which introduces corrosion of the metal container. Where liners are not used, with the cover removed the interior of the container can be readily washed or wiped to remove the corrosive-causing spray material.

We have illustrated and described our invention in a highly practical commercial embodiment thereof. It will be understood that commercially the size or capacity of the containers is varied and that the liners vary in size according to the receptacle variations.

We have illustrated and described our invention in a desirable embodiment thereof. We have not attempted to illustrate other embodiments as it is believed that this disclosure will enable those skilled in the art to embody or adapt our invention as may be desired.

Having thus described the invention, what is claimed as new and desired to secure by Letters Patent is:

1. In a sprayer, the combination of a cylindrical receptacle having an integral outwardly projecting annular rim of cylindrical cross section on its upper edge, a cover having a pressure pump and a discharge outlet means supportedly mounted thereon in inwardly spaced relation to said rim, said cover having an integral annular upwardly offset rim of downwardly facing channel section disposed in overhanging noncontacting relation to said rim on said receptacle, a resilient gasket supportedly and sealingly disposed in said rim of said cover in supported relation to said rim on said receptacle, a plurality of angularly spaced clamp brackets fixedly mounted on said cover at the inner side of said rim in outwardly projecting overhanging relation to its said rim and having portions thereof in supported engagement with said rim and having vertical slots therein, clamps having pivots pivotally and slidably engaged with said slots in said brackets and having jaws engageable with said receptacle rim with said gasket under sealing stress between said receptacle and cover, and a flexible liquid impenetrable liner for said receptacle disposed therein with its upper end wrapped around its rim and projecting downwardly therefrom on the outer side of the receptacle and clampingly engaged by said clamps.

2. In a sprayer, the combination of a receptacle of uniform cross section having an integral outwardly projecting annular rim on its upper edge, a cover having a pressure pump and a discharge outlet means supportedly mounted thereon, said cover having an integral annular rim of downwardly facing channel section disposed in overhanging noncontacting relation to said rim on said receptacle, a resilient gasket supportedly and sealingly disposed in said rim of said cover in coacting relation to said rim on said receptacle, a plurality of angularly spaced clamp brackets fixedly mounted on said cover in outwardly projecting overhanging relation to its said rim and having vertical slots therein, clamps having pivots pivotally and slidably engaged with said slots in said brackets and having jaws engageable with said receptacle rim with said gasket under clamping sealing stress between said receptacle and cover, and a flexible liquid holding liner for said receptacle disposed therein with its upper end wrapped around its rim and projecting downwardly therefrom on the outer side of the receptacle and clampingly engaged by said clamps.

3. In a sprayer, the combination of a receptacle of uniform cross section having an integral outwardly projecting annular rim on its upper edge, a cover having a pressure pump and a discharge outlet means supportedly mounted thereon, said cover having an integral annular rim of downwardly facing channel section disposed in overhanging noncontacting relation to said rim on said receptacle, a resilient gasket supportedly and sealingly disposed in said rim of said cover in coacting relation to said rim on said receptacle, a plurality of angularly spaced clamp brackets fixedly mounted on said cover and having vertical slots therein disposed above said rim, clamps having pivots engaged with said slots in said brackets and having jaws engageable with said receptacle rim with said gasket under clamping sealing stress between said receptacle and cover rims, and a flexible liquid holding liner for said receptacle disposed therein with its side portion in supported engagement with said receptacle wall and with its upper end wrapped around its rim and projecting downwardly therefrom on the outer side of the receptacle.

4. In a sprayer, the combination of a receptacle having an integral outwardly projecting annular rim of cylindrical cross section on its upper edge, a flexible liquid holding liner for said receptacle disposed therein with its upper end overlapping its rim, a cover having a pressure pump and a discharge outlet means supportedly mounted thereon, said cover having an integral annular rim of downwardly facing channel section disposed in overhanging noncontacting relation to said rim on said receptacle, a resilient gasket supportedly and sealingly disposed in said rim of said cover in supported relation to said rim on said receptacle, a plurality of angularly spaced clamp brackets mounted on said cover and having vertical slots therein, and clamps having pivots pivotally and slidably engaged with said slots in said brackets and engageable with said receptacle rim and with said liner with said gasket under sealing stress between said receptacle and cover.

5. In a sprayer, the combination of a receptacle having an integral outwardly projecting continuous rim on its upper edge, a flexible liquid container for said receptacle disposed therein with its upper end wrapped around its rim and projecting downwardly therefrom on the outer side of the receptacle, a cover having a pressure pump and a discharge outlet means supportedly mounted thereon, said cover having an integral annular rim of downwardly facing channel section disposed in overhanging noncontacting relation to said rim on said receptacle, a resilient gasket supportedly and sealingly disposed in said rim of said cover in supported relation to said rim of said receptacle, a plurality of angularly spaced clamp brackets mounted on said cover, and clamps pivotally mounted on said brackets and engageable with said receptacle rim and with said liner with said gasket under sealing stress between said receptacle and cover.

6. In a sprayer, the combination of a receptacle having an outwardly projecting continuous rim on its upper edge, a cover having a pressure pump and a discharge outlet means supportedly mounted thereon, said cover having an integral annular rim disposed in overhanging noncontacting relation to said rim on said receptacle, a resilient gasket supportedly and sealingly disposed on said rim of said cover in coacting relation to said rim on said receptacle, a plurality of angularly spaced clamps pivotally mounted on said cover to depend from the edge thereof and having jaws engageable with said receptacle rim with said gasket under clamping sealing stress between said receptacle and cover, and a flexible liquid container liner for said receptacle disposed therein with its upper end wrapped around its rim and projecting downwardly therefrom on the outer side of the receptacle and clampingly engaged by said clamps.

7. In a sprayer, the combination of a receptacle having an outwardly projecting continuous rim on its upper edge, a cover having a pressure pump and a discharge outlet means supportedly mounted thereon, said cover having an integral annular rim disposed in overhanging noncontacting relation to said rim on said receptacle, a resilient gasket supportedly and sealingly disposed on said rim of said cover in coacting relation to said rim on said receptacle, a plurality of angularly spaced clamps mounted on said cover to depend from the edge thereof and having jaws engageable with said receptacle rim with said gasket under clamping sealing stress between said receptacle and cover no metal part of said cover being in contacting relation with said receptacle, and a flexible liquid container liner for said receptacle disposed therein with its upper end wrapped around its rim and with its side portion in outward supported engagement with said receptacle side wall throughout.

8. In a sprayer, the combination of a receptacle having an integral outwardly projecting continuous rim on its upper edge, a flexible liquid container for said receptacle disposed therein with its upper edge overlapping said rim and in supported engagement with the side wall of said receptacle throughout the length of said liquid container, a cover having a pressure pump and a discharge outlet means supportedly mounted thereon and having an integral annular rim of downwardly facing channel section disposed in overhanging noncontacting relation to said rim of said receptacle, a resilient gasket of inwardly facing channel section disposed within said channel with the lower flange thereof projecting from the channel in overlapping relation to the rim of said receptacle, and means for clampingly securing said cover to said receptacle comprising clamps adjustably mounted on said cover to depend downwardly therefrom and releasably engageable on the underside thereof with said flange on said receptacle and in thrust supported engagement with the side of the receptacle when in clamping position, and when engaged therewith subjecting said flanges of said gasket to sealing compression stress.

9. In a sprayer, the combination of a receptacle having an integral outwardly projecting continuous rim on its upper edge, a cover having a pressure pump and a discharge outlet means supportedly mounted thereon and having an integral annular rim of downwardly facing channel section disposed in overhanging noncontacting relation to said rim of said receptacle, a resilient gasket of inwardly facing channel section disposed within said channel with the lower flange thereof projecting from the channel in overlapping relation to the rim of said receptacle, and means for clampingly securing said cover to said receptacle comprising clamps adjustably mounted on said cover to depend on the outer side of said receptacle and releasably engageable with said flange on said receptacle in thrust supported engagement with the side of the receptacle below said flange, and when engaged therewith subjecting said flanges of said gasket to sealing compression stress.

References Cited in the file of this patent

UNITED STATES PATENTS

| | | |
|---|---|---|
| 961,456 | Mastin | June 14, 1910 |
| 1,439,000 | Jacobs | Dec. 19, 1922 |
| 1,579,672 | Strecker | Apr. 6, 1926 |
| 1,986,444 | McIntosh | Jan. 1, 1935 |
| 2,390,831 | Fitch | Dec. 11, 1945 |
| 2,816,691 | Ward | Dec. 17, 1957 |
| 2,989,208 | Gibbs | June 20, 1961 |